Figure 1:
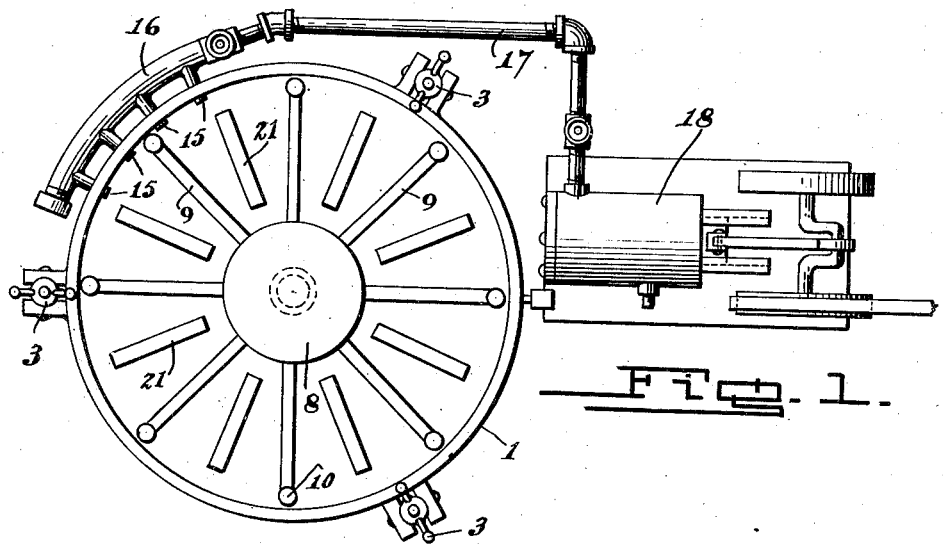

Oct. 13, 1925.

E. G. GRAB 1,557,358

METHOD OF TREATING FRUIT FOR CANNING PURPOSES

Original Filed Aug. 20, 1923

Inventor
E. G. Grab

Patented Oct. 13, 1925.

1,557,358

UNITED STATES PATENT OFFICE.

EUGENE G. GRAB, OF WASHINGTON, DISTRICT OF COLUMBIA.

METHOD OF TREATING FRUIT FOR CANNING PURPOSES.

Application filed August 20, 1923, Serial No. 658,369. Renewed June 16, 1925.

*To all whom it may concern:*

Be it known that EUGENE G. GRAB, a citizen of the United States, residing at Washington, in the District of Columbia, has invented certain new and useful Improvements in Methods of Treating Fruit for Canning Purposes, of which the following is a specification.

This invention relates to new and useful improvements in the treatment of fruit for canning purposes and the primary object of the invention is to provide a new and improved method of treating all kinds of fruits, including pome and citrus fruits and berries in order to form what is known as a solid pack in the canning thereof.

In setting forth the objects of the invention and in describing the same, I may refer constantly to the treatment and canning of apples for example, but it will be understood that the invention applies equally well to all kinds of fruits.

It is a well known fact that in the ordinary treatment and canning of fruits a considerable quantity of water, air and gases are present in the can so that when a purchaser obtains any size can of such fruit a full measure of the fruit does not exist. Moreover, the existence of a quantity of water in a can reduces the quality of the fruit and further inasmuch as water is heavier than the fruit in weight, there is an expense involved in shipment for which value is not received.

As stated, the primary object of my improved method is to treat apples and other fruits so as to form what is known as a solid pack in canning and by providing such a pack the quality of the fruit is greatly improved. A solid pack of apples is conspicuously devoid of any quantity of water when canned, thus preventing leaching that occurs in the old method and the fruit has a superior flavor, owing to the fact that substantially all air, gases and water are excluded. A full measure of fruit will thus be provided to the consumer so that full value is received when such cans of fruit are purchased, and as apples weigh less than water, there is no added expense in shipment of the solid pack apples over the regular pack apples produced under the old methods. The fact that substantially all air and gases are excluded reduces to a minimum the opportunity of a chemical action between the fruit and the metal of the can in which the same is packed.

A still further object of the invention resides in providing a method of treating fruit, which method is comparatively inexpensive and permits of the canned fruit being sold at the same or a slightly increased price over the price of the fruit canned under the old methods.

With these and other objects in view, my invention consists in the method specifically described herebelow.

Figure 2:
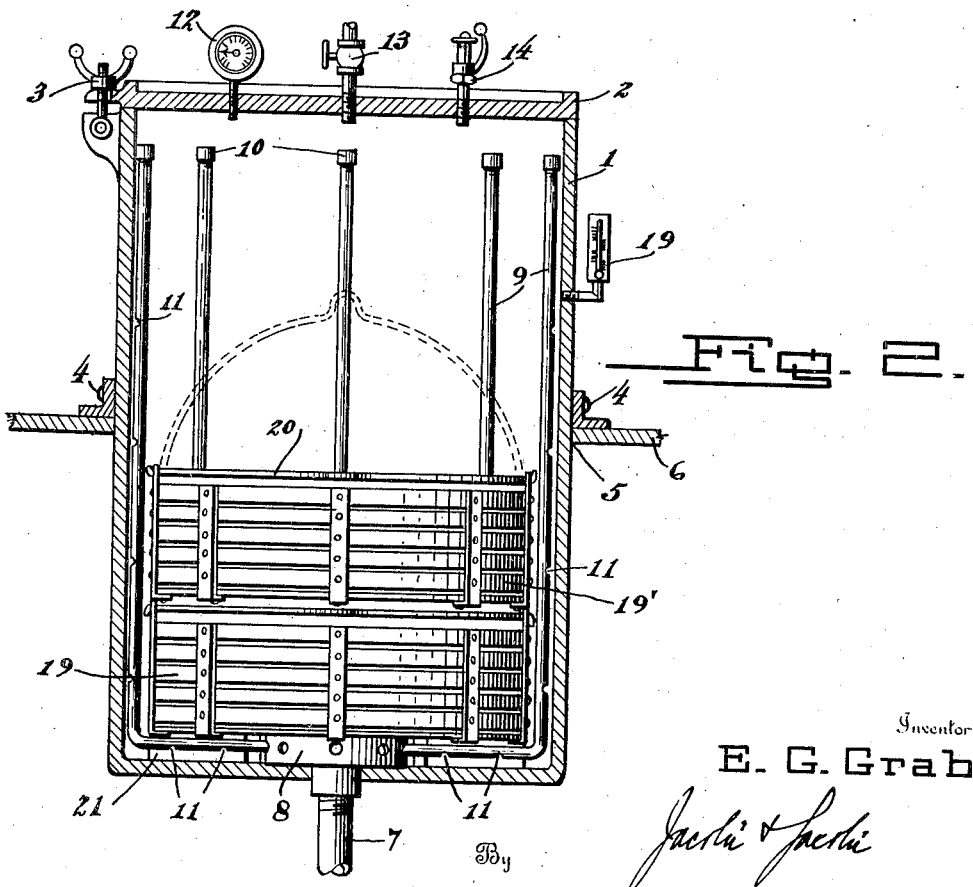

In the accompanying drawing, forming a part of this application,

Figure 1 is a top plan view of the retort and vacuum pump connected therewith, the top of the retort being removed, and Figure 2 is a vertical section therethrough with the top applied and crates within said retort.

In carrying out my invention, I shall refer to the drawing in which similar reference characters designate corresponding parts throughout the several views, and in which 1 designates a metal retort of any desired size and shape, but I have preferably disclosed the same as cylindrical in design and provided with a removable cover or top 2 which is adapted to be locked in position on the retort by means of clamps 3 of a conventional type. About midway of the body of the retort 1 is secured an annular, external flange 4 which is formed preferably of angle iron and as said retort is adapted to fit through an opening 5 in the floor 6 of the structure wherein the process is carried on, it will be observed that this flange 4 will permit of a portion of the retort to project above and below said floor. This annular band or flange 4 in addition to properly supporting the retort in the flooring also performs another function in that it prevents the collapsing of said retort.

Extending through the bottom of the retort 1 is a steam pipe 7 which connects with a steam head 8, the latter resting on the inner wall of said bottom of the retort, and connected with said steam head 8 are the steam distributing pipes 9. These pipes 9 are angular in design, as clearly disclosed in the drawing, and the vertical portions thereof extend upwardly immediately adjacent the inner wall of the retort to a plane adjacent the top or cover 2, the upper free ends of said pipes being capped or otherwise closed, as shown at 10. These pipes 9 are provided at regular intervals with outlet openings 11, said openings facing outwardly from the vertical portions and downwardly from the horizontal portions of said angular pipes 9, so that the steam emanating therefrom will be directed against the walls of the retort and reflected therefrom.

The cover 2 is provided with a steam gauge 12, a steam outlet 13 and a safety valve 14, all three of which are of a conventional design.

Connected with the upper portion of the retort 1 below the top thereof, are a plurality of outlet pipes 15 which connect with a manifold 16, the latter also connecting, through the medium of a pipe 17, with a suction pump 18, the latter being of any desired construction. A thermometer 19 is mounted in the wall of the retort, as shown in Fig. 2 of the drawing, for obvious purposes.

In carrying out my process of treatment I also utilize a plurality of metal crates 19' which are formed preferably of annular spaced metal bands. These crates are provided with bails 20 and are adapted to be mounted one upon the other within the retort between the steam pipes. In order to prevent the lowermost crate from resting upon the horizontal portions of the steam pipes 9, supporting blocks 21 are mounted on the bottom of the retort 1 between the pipes 9, as clearly shown in Fig. 1 of the drawing.

In carrying out my method of treatment, apples are first trimmed and quartered and then placed in the metal crates 19'. The crates are then superimposed within the retort 1 and said retort closed. The vacuum or suction pump 18 is then placed in operation and the air is extracted from the retort and a partial vacuum is formed within the retort to the amount of about 28 inches. In extracting the air from the retort, the air and gases from the apples will also be extracted which is extremely important in this method of treatment.

When the proper amount of vacuum has been formed in the retort, the pump 18 is discontinued in its operation, the connection between said retort and pump closed, and live steam is admitted through the pipe 7 and correspondingly admitted to the retort through the pipes 9. In this connection it may be stated that without clamping the top or cover 2 in the retort, said top or cover remains tight thereon under the action of the vacuum being formed when the air is extracted from said retort, and this will be true until the steam pressure overcomes the action of the vacuum, whereupon the top is automatically lifted.

The introduction of steam to the retort through the medium of the openings in the pipes 9 causes said steam to be thoroughly circulated throughout the interior of the retort, and a slight preliminary cooking of the apples thus takes place. This cooking is unessential as the cooking process is conducted later after the fruit has been placed in the cans. Upon the extraction of the air and gases from the fruit, the cell walls of said fruit have a tendency to collapse and said cell walls actually collapse upon the introduction of the steam thereto, thus shrinking the fruit. The introducing of steam is continued until the vacuum is overcome, thus eliminating opportunity for the return of air and gases to the cells of the fruit. The apples are then removed in crates and immediately chilled with cold water to shrink the same, whereupon the same are ready for canning. The chilling of the apples after removal from the retort is also an important step in my improved method, as it will be observed that the shrinking takes place at a time when all or substantially all gases and air have been removed.

From the foregoing it will be observed that I have provided a simple, inexpensive, and efficient means for carrying out the objects of the invention. I have illustrated and described a particular apparatus for carrying out the process or method referred to, and it is my own and original design, yet I do not wish to be limited to this exact construction, because various changes in form, proportion, and in the minor details of construction may be resorted to without departing from the spirit or sacrificing any of the principles of the invention.

Having thus described my invention, what I claim is:—

1. A method of treating fruit or the like in bulk consisting in extracting air and gases therefrom and instantly applying and equally distributing steam thereto.

2. A method of treating fruit or the like in bulk, consisting in placing prepared fruit in a retort, forming a vacuum therein to extract air and gases from the cells of the fruit and applying steam to the retort in a manner to equally distribute the same to the contents thereof to overcome the vacuum therein and cause the fruit to remain solid and firm.

3. A method of treating fruit to provide for a solid packing thereof, consisting in placing the fruit in bulk in a retort, forming a vacuum therein to extract the air and gases from the cells of the fruit, then instantly applying steam to said retort to overcome the vacuum therein and equally distribute said steam to the fruit therein, removing the fruit from the retort, and chilling the same.

In testimony whereof I affix my signature.

EUGENE G. GRAB.

DISCLAIMER 1,557,358.—*Eugene G. Grab*, Washington, D. C. METHOD OF TREATING FRUIT FOR CANNING PURPOSES. Patent dated October 13, 1925. Disclaimer filed April 20, 1934, by the assignee, *National Fruit Product Company, Inc.*

Hereby enters this disclaimer to that part of the claim in said specification which is in the following words, to wit:

"1. A method of treating fruit or the like in bulk consisting in extracting air and gases therefrom and instantly applying and equally distributing steam thereto.

"2. A method of treating fruit or the like in bulk, consisting in placing prepared fruit in a retort, forming a vacuum therein to extract air and gases from the cells of the fruit and applying steam to the retort in a manner to equally distribute the same to the contents thereof to overcome the vacuum therein and cause the fruit to remain solid and firm.

"3. A method of treating fruit to provide for a solid packing thereof, consisting in placing the fruit in bulk in a retort, forming a vacuum therein to extract the air and gases from the cells of the fruit, then instantly applying steam to said retort to overcome the vacuum therein and equally distribute said steam to the fruit therein, removing the fruit from the retort, and chilling the same."— except when the method defined by said claims, or any of them, is employed in the treatment of apples preparatory to canning them.

[*Official Gazette May 15, 1934.*]